May 1, 1945. W. L. KAUFFMAN, 2D Re. 22,639
WRINGER
Original Filed May 11, 1933 2 Sheets-Sheet 1
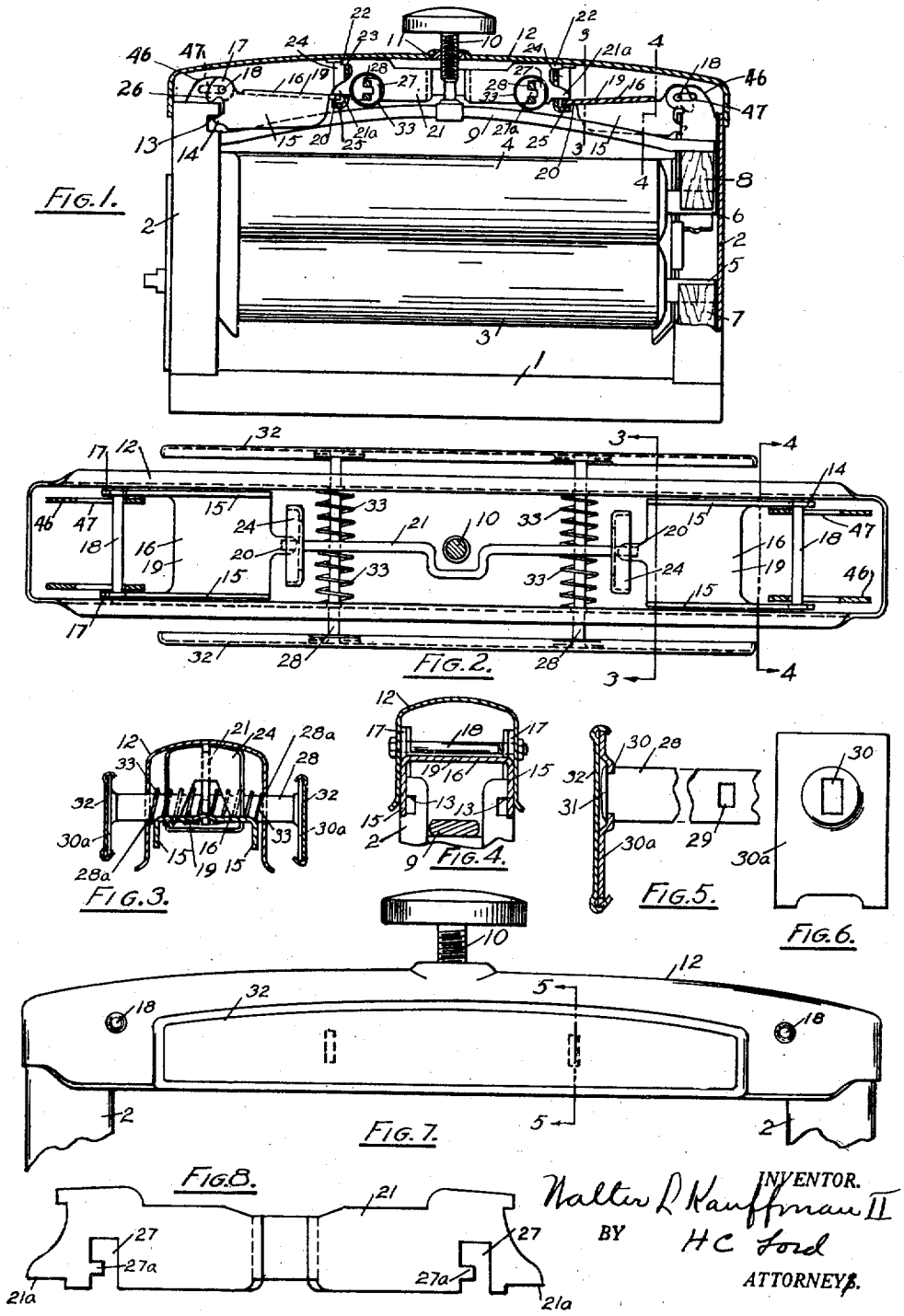
INVENTOR.
Walter L. Kauffman II
BY
H C Ford
ATTORNEYS.

May 1, 1945. W. L. KAUFFMAN, 2D Re. 22,639

WRINGER

Original Filed May 11, 1933 2 Sheets-Sheet 2

INVENTOR.
Walter L. Kauffman II
BY H. C. Ford
ATTORNEYS.

Reissued May 1, 1945

Re. 22,639

UNITED STATES PATENT OFFICE 22,639

WRINGER

Walter L. Kauffman, II, Erie, Pa., assignor to Lovell Manufacturing Company, Erie, Pa., a corporation of Pennsylvania Original No. 2,087,977, dated July 27, 1937, Serial No. 670,461, May 11, 1933. Application for reissue September 6, 1938, Serial No. 228,713

14 Claims. (Cl. 68—263)

Power wringers involve an element of danger in the possibility of injury to the operator through indrawing of the hand, or clothing between the rolls. Many power wringers have been provided with means for relieving the pressure on the rolls in an effort to avert serious injury from this cause. The present invention is directed to improving such release devices. Features and details of the invention will appear from the specification and claims.

A preferred embodiment of the invention is illustrated in the accompanying drawings as follows:

Fig. 1 shows a front elevation of a wringer, partly in section with the release device in place thereon.

Fig. 2 is a bottom view of the top bar removed.

Fig. 3 a section on the lines 3—3 in Figs. 1 and 2.

Fig. 4 a section on the lines 4—4 in Figs. 1 and 2.

Fig. 5 a section on the line 5—5 in Fig. 7.

Fig. 6 an elevation of the plate for securing the operating bar.

Fig. 7 an enlarged front elevation of the top of the wringer.

Fig. 8 a detached view of a trip plate.

Figure 9:
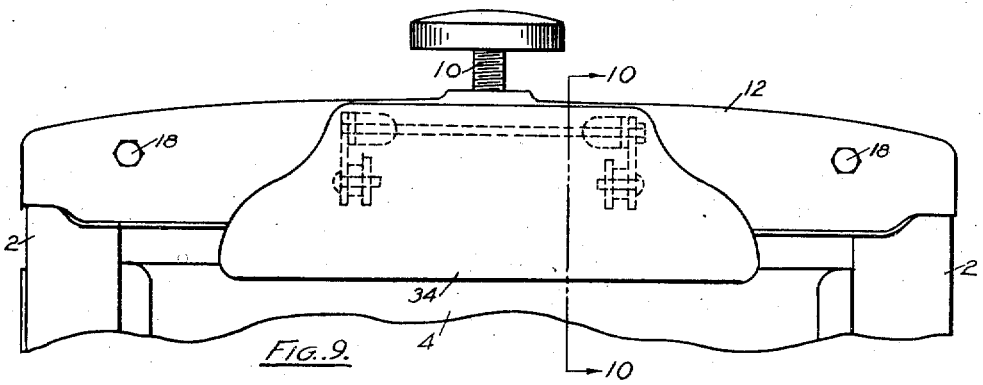

Fig. 9 a front elevation of the upper part of a wringer with a modification.

Figure 10:
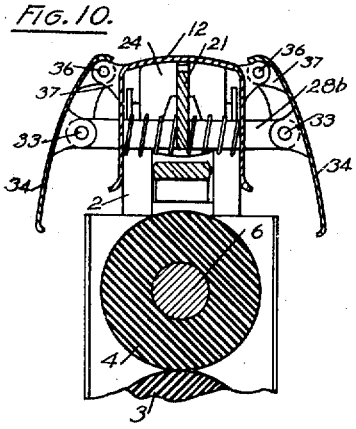

Fig. 10 a section on the line 10—10 in Fig. 9.

Figure 11:
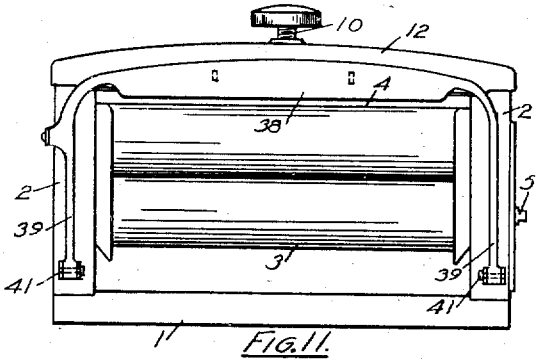

Fig. 11 a front elevation of a further modification.

Figure 12:
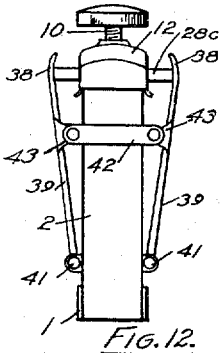

Fig. 12 an end elevation of the wringer shown in Fig. 11.

Figure 13:
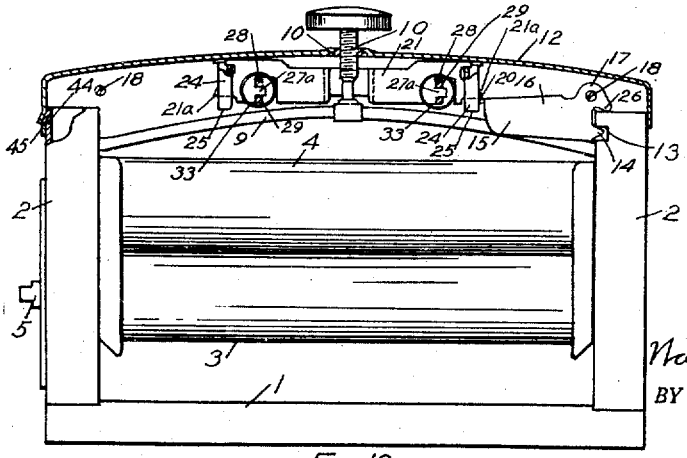

Fig. 13 an elevation, partly in section, showing a further modification.

The frame has a base 1 and side stiles 2. The side stiles are hollow. Rolls 3 and 4 have shafts 5 and 6 and these shafts are journaled in bearing blocks 7 and 8 arranged in the side stiles. A spring 9 rests on the upper ends of the bearing blocks 8. The spring is tensioned by a screw 10. The screw operates in a nut 11 secured in a top bar 12. The top bar is channel-shaped with closed ends and is detachably secured to the side stiles, the top bar extending over the tops of the side stiles. Notches 13 are cut in the side stiles near the upper ends and these are engaged by hooks 14 arranged on the side walls 15 of latches 16. The latches are U-shaped and have upturned ears 17 through which a rod 18 extends, the rod being secured in the side walls of the top bar. The top 19 of the latch plate has an extension 20 which engages the trip extension 21*a* of a trip plate 21.

The trip plate has extending ears 22 and these extend through perforations 23 in brackets 24, the brackets being secured to the under-side of the top bar. These brackets have flanges 25. The lower portion of the flange forms a stop for the extension 20 and thus locates the latches in position to be engaged by the trip plate. The ears 17 have extensions 26 which engage the upper edge of the stile and thus swing the latches so as to effect the engagement of the hooks as the top bar is set in place on the top of the frame.

The trip plate has openings 27 into which project pivot lugs 27*a*. Cross bars 28 are slidingly mounted in perforations 28*a* in the side walls of the top bar. These cross bars extend through the perforations 27 and in turn have perforations 29 which engage the pivot lugs 27*a*. In assembling, the cross bars pass through the side perforations 28*a*, the openings 27 and the lip 22 at the right is moved into place. The bracket 24 is then moved into place and secured.

The ends of the cross bars 28 are notched and extend through openings 30 in securing plates 30*a*. The ends of the cross bars are headed over at 31 on the securing plates, as shown in Fig. 7 and the operating bars 32 have their edges beaded over, thus finishing these operating bars and securing them on the securing plates 30*a*. Springs 33 are secured around the cross bars 28 and engage the side walls of the top bar and thus yieldingly press the trip plate to its central position.

In operation when the emergency arises the operator strikes either of the operating bars 32. These bars through the cross bars communicate movement to the trip plate 21. This swings the extensions 27*a* off of the trip extensions 20 of the latches 16. Immediately these latches swing up sufficiently to release the hooks 14 from the notches 13 and the top bar is thus released and with the releasing of the top bar pressure on the rolls is relieved. After release the latch is ordinarily held in its up-swung position by the end 21*a* of the plate 21. As the top is pressed down to place the operating release bar is actuated swinging the end 21*a* so as to permit the latch to swing to set position. This downward movement of the latch is definitely accomplished through the extension 26 as it engages the top of the stile. If the latch should drop to its lower position before the resetting operation is started, the cam surface on the under-side of the hook 14 will swing the inner end of the latch upwardly so as to permit the clearance of the hook 14 past the face of the stile, the plate 21 being swung momentarily to permit this movement.

It will be noted that this trip mechanism, except for the operating extensions, is housed within the top bar; that it permits immediately the release of both ends of the top bar and consequently both ends of the rollers so that regardless of where the hand may be caught the relief movement is ample. In some prior structures where the effort is made to relieve both ends of the roll the friction surfaces sustaining the entire pressure of the rolls have been moved by the releasing mechanism. The effort to effect a release of these dual friction surfaces under such pressure has been greater than is desirable and consequently to avoid this result many release devices release but one end of the top bar, or the roll. In the present device, the latches present a short and long arm at each side of the pivot of the latch. The side, or end, of the arm sustaining the pressure load is very short as compared to the releasing end of the arm. Consequently the frictional pressure of the releasing surfaces between the extension 20 and 21*a* is very slight, thus making a very sensitive release; still one that is very safe against accidental release. The sliding mounting of the operating bars simplifies the mechanism in many respects, particularly where that is carried into the top bar. It provides a simple means for an operating bar extending along the top bar and one which is operative with equal facility from end to end so that a release is almost sure to be effected even under panic conditions which exist when the emergency arises and this in relation to the double release assures a complete release with the hand caught in any part of the length of the rolls both because of the relief of pressure on all parts of the roll and because of the certainty with which the operator with the free hand may reach the release mechanism. In order to retard the upthrow of the top bar arresting straps 46 of U form have sides pivotally mounted on the pins 18, the pins extending through slots 47 in the straps 46. The straps, through engagement with the ends of the shaft 6, carry the blocks 8 and roll upwardly in the retarding action and lift the roll out of the stiles when the top bar is lifted off the wringer.

In the modification shown in Figs. 9 and 10 the latch mechanism within the top bar is similar to that shown in Fig. 1. The cross bars 28*b* are pivotally secured at 33 to plates 34 secured on the inner sides of operating bars 35. The upper edges of the operating bars are pivotally mounted on the top bar by means of pins 36 extending through the upper ends of the plates 34 and ears 37 on the top bar. This pivotal plate extends over and along the major portion of the top bar and makes a simple support for the operating bar.

In Figs. 11 and 12 a modification is shown in which an operating bar 38 operates on cross bars 28*c*, the cross bars and latch mechanism within the top bar being similar to that shown in Fig. 1. Operating bars 38 extend across the face of the wringer along the top bar and these engage the ends of the cross bars 28*c*. The cross bars 38 have downward extensions 39 at the ends making the bar as a whole bail-shaped and the lower ends of these extensions are pivotally mounted by pins 41 between ears 40 on the side stiles. The bars 38 are connected by links 42 which are pivotally secured to ears 43 on the downward extensions 39.

In Fig. 13 a release structure is shown which corresponds to that shown in Fig. 1 except that the latch mechanism is confined to one end of the wringer. The stile at the opposite end of the wringer has a shoulder 44 which engages a shoulder 45 on the end of the top bar. With this structure one end of the top bar is released and as it swings upwardly it releases the locking engagement at the opposite end. In some respects this is simpler and cushions somewhat the blow of the upward movement of the top bar, but the relief to the pressure is not as instantaneous, nor as uniform as with the double release.

What I claim as new is:

1. In a wringer, the combination of a frame comprising a top bar; rolls mounted in the frame; pressure means for the rolls exerting pressure from the top bar; means securing and releasing the top bar from the frame at each end of the wringer comprising latch members pivoted intermediate their ends to the top bar having a short arm sustaining from the pivot the pressure of the top bar and a long arm to which the pressure is communicated through the lever action; and a trip device between the latches operating on and movable out of engagement with the long arms of the latches and comprising an operating bar actuating the device and carried by and extending longitudinally along the top bar.

2. In a wringer, the combination of a frame comprising a top bar; rolls mounted in the frame; pressure means for the rolls exerting pressure from the top bar; means securing and releasing the top bar from the frame at each end of the wringer comprising latch members pivoted intermediate their ends to the top bar having a short arm substaining from the pivot the pressure of the top bar and a long arm to which the pressure is communicated through the lever action; and a trip device operating on and movable out of engagement with the long arms comprising a slidingly mounted operating bar actuating the device.

3. In a wringer, the combination of a frame comprising a top bar; rolls mounted in the frame; pressure means for the rolls exerting pressure from the top bar; means securing and releasing the top bar from the frame at each end of the wringer comprising latch members pivoted intermediate their ends to the top bar having a short arm sustaining from the pivot the pressure of the top bar and a long arm to which the pressure is communicated through the lever action; and a trip device operating on and movable out of engagement with the long arms comprising an operating bar actuating said device and slidingly mounted on the top bar.

4. In a wringer, the combination of a frame comprising a top bar; rolls mounted in the frame; pressure means for the rolls exerting pressure from the top bar; means securing and releasing the top bar from the frame at each end of the wringer comprising latch members pivoted intermediate their ends to the top bar having a short arm sustaining the pressure of the top bar and a long arm; and a trip device operating on the long arms comprising an operating bar actuating said device and pivotally mounted on an axis extending longitudinally of the top bar.

5. In a wringer, the combination of a frame comprising a top bar; rolls mounted in the frame; pressure means for the rolls exerting pressure from the top bar; means securing and releasing the top bar from the frame at each end of the wringer comprising latch members pivoted intermediate their ends to the top bar having a short arm sustaining the pressure of the top bar and a long arm; and a trip device operating on the long arms comprising an operating bar actuating said device and pivotally mounted on the top bar with an axis extending longitudinally of the top bar.

6. In a wringer, the combination of a frame comprising a top bar; rolls mounted in the frame; pressure means for the rolls exerting pressure from the top bar; means securing and releasing the top bar from the frame at each end of the wringer comprising latch members pivoted intermediate their ends to the top bar having a short arm sustaining the pressure of the top bar and a long arm; and a trip device comprising a trip bar between the latches swingingly mounted on the top bar with an axis extending longitudinally of the top bar and acting on the long arms of the latches.

7. In a wringer, the combination of a frame comprising a top bar; rolls mounted in the frame; pressure means for the rolls exerting pressure from the top bar; means securing and releasing the top bar at an end of the top bar comprising a shoulder in the frame; a latch pivoted on the top bar and having an arm at one side of the pivot engaging said shoulder and a longer arm at the opposite side of the pivot extending toward the center of the top bar; and operating means movable out of holding engagement with the larger arm to cause actuation of the latch, said latch releasing, when operated, the top bar and with it the pressure on the wringer.

8. In a wringer, the combination of a frame comprising a top bar; rolls mounted in the frame; pressure means for the rolls exerting pressure from the top bar; means releasing and securing the top bar comprising a latch pivoted to the top bar securing said top bar at one end on the frame; a trip plate pivotally mounted within the top bar with its axis extending longitudinally of the top bar and restraining said pivoted latch, a movable cross bar, said trip plate being notched to receive and engage the cross bar; and an operating bar extending along the top bar secured to the cross bar.

9. In a wringer, the combination of a frame comprising a top bar; rolls mounted in the frame; pressure means for the rolls exerting pressure from the top bar; means releasing and securing the top bar comprising a latch pivoted to the top bar securing said top bar at one end of the frame; a trip plate pivotally mounted within the top bar with its axis extending longitudinally of the top bar and restraining said pivoted latch, a movable cross bar, said trip plate being notched to receive and engage the cross bar; an operating bar extending along the top bar secured to the cross bar; and springs between the trip plate and the sides of the top bar yieldingly locating the trip plate.

10. In a wringer the combination of a frame, comprising a top bar; rolls mounted in the frame; pressure means for the rolls exerting pressure from the top bar; means securing and releasing the top bar from the frame at an end of the top bar, comprising a latch member pivoted intermediate its ends to the top bar having a short arm sustaining from the pivot the pressure of the top bar and a long arm to which the pressure is communicated; and a trip device operating on and movable out of engagement with the long arm comprising an operating bar actuating the device and carried by and extending longitudinally along the top bar.

11. In a wringer the combination of a frame comprising a top bar; rolls mounted in the frame; pressure means for the rolls exerting pressure from the top bar; means securing and releasing the top bar from the frame at an end of the top bar, comprising a latch member pivoted intermediate its ends to the top bar having a short arm sustaining from the pivot the pressure of the top bar, and a long arm to which the pressure is communicated; and a trip device operating on and movable out of engagement with the long arm comprising a slidingly mounted operating bar actuating said device.

12. In a wringer, the combination of a frame comprising a base and side stiles; a top bar; rolls mounted in the frame; pressure means for the rolls exerting pressure from the top bar; means detachably securing an end of the top bar on the frame comprising a release device adapted to release the top bar to release the pressure on the rolls, said release device including a trip plate pivotally mounted within the top bar with its axis extending longitudinally along the top bar; and a manually operative means actuating the trip plate.

13. In a wringer, the combination of a frame comprising a base and stiles; rolls in the frame; a top bar on the stiles, said top bar being of channel form; a pressure means exerting pressure from the top bar to the rolls; a release device releasing the pressure of the pressure means, having an operating member pivoted longitudinally within the top bar and swinging cross-ways of the top bar to effect a release; an operating bar extending longitudinally of the wringer and operable cross-ways of the wringer; and a connection between the operating bar and the operating member.

14. In a wringer, the combination of a frame comprising a base and stiles; rolls in the frame; a top bar on the stiles, said top bar being of channel form; a pressure means exerting pressure from the top bar to the rolls; a release device releasing the pressure of the pressure means, having an operating member pivoted longitudinally within the top bar and swinging cross-ways of the top bar to effect a release; an operating bar extending longitudinally of the wringer and operable cross-ways of the wringer; and a connection between the operating bar and the operating member, said connection being slidingly mounted in the top bar.

WALTER L. KAUFFMAN, II.